United States Patent
Li (10) Patent No.: US 7,796,702 B2
(45) Date of Patent: Sep. 14, 2010

(54) CODED ANTENNA SWITCHING FOR WIRELESS COMMUNICATIONS AND ASSOCIATED METHODS

(75) Inventor: Yingxue Li, Exton, PA (US)

(73) Assignee: InterDigital Technology Corporation, Wilmington, DE (US)

(*) Notice: Subject to any disclaimer, the term of this patent is extended or adjusted under 35 U.S.C. 154(b) by 829 days.

(21) Appl. No.: 11/459,757

(22) Filed: Jul. 25, 2006

(65) Prior Publication Data
US 2007/0025467 A1 Feb. 1, 2007

Related U.S. Application Data

(60) Provisional application No. 60/702,973, filed on Jul. 27, 2005, provisional application No. 60/803,786, filed on Jun. 2, 2006.

(51) Int. Cl.
H04B 7/02 (2006.01)
H04L 1/02 (2006.01)

(52) U.S. Cl. .............. 375/267; 375/299; 375/265; 375/262; 375/341; 455/500; 455/101

(58) Field of Classification Search .............. 375/267, 375/265, 262, 341, 299; 455/500, 101; 370/204
See application file for complete search history.

(56) References Cited

U.S. PATENT DOCUMENTS

| | | | |
|---|---|---|---|
| 5,987,067 A | 11/1999 | Song | 375/253 |
| 6,185,258 B1 | 2/2001 | Alamouti et al. | 375/260 |
| 6,317,411 B1 * | 11/2001 | Whinnett et al. | 370/204 |
| 6,593,882 B1 | 7/2003 | Kim et al. | 342/373 |
| 2004/0095907 A1 | 5/2004 | Agee et al. | 370/334 |
| 2004/0196813 A1 | 10/2004 | Ofek et al. | 370/334 |
| 2005/0090205 A1 | 4/2005 | Catreux-Erceg et al. | 455/78 |
| 2005/0130606 A1 | 6/2005 | Wang et al. | 455/101 |

OTHER PUBLICATIONS

Tarokh et al., Space-Time Codes for High Data Rate Wireless Communication: Performance Criterion and Code Construction, IEEE Transactions on Information Theory, vol. 44, No. 2, Mar. 1998.

* cited by examiner

*Primary Examiner*—Phuong Phu
(74) *Attorney, Agent, or Firm*—Allen, Dyer, Doppelt, Milbrath & Gilchrist, P.A.

(57) ABSTRACT

A wireless communications device includes an encoder having an input for receiving an input symbol, and generates based upon the input symbol a channel symbol and an antenna control symbol. At least one transmitter is coupled to the encoder for receiving the channel symbol. An antenna switch is coupled to the encoder for receiving the antenna control symbol, and to the at least one transmitter for receiving the channel symbol to be transmitted. An antenna array is coupled to the antenna switch and includes N antenna elements, with $N \geq 2$. The antenna switch selects less than N antenna elements based upon the antenna control symbol for transmitting the channel symbol.

34 Claims, 5 Drawing Sheets

CODED ANTENNA SWITCHING FOR WIRELESS COMMUNICATIONS AND ASSOCIATED METHODS

RELATED APPLICATION

This application claims the benefit of U.S. Provisional Application Ser. No. 60/702,973 filed Jul. 27, 2005 and 60/803,786 filed Jun. 2, 2006, the entire contents of which are incorporated herein by reference.

FIELD OF THE INVENTION

The present invention relates to wireless communications, and more particularly, to a wireless communications device utilizing spatial transmit diversity to enhance wireless link reliability.

BACKGROUND OF THE INVENTION

Space-time coding (STC) techniques have been extensively studied to provide spatial transmit diversity, which is also referred to as antenna diversity or transmit diversity. A primary goal of spatial transmit diversity is to enhance wireless link reliability, and to meet increasing demands for higher data rates.

In space-time coding techniques, information bits are encoded by a space-time encoder into multiple streams, and each stream is modulated and transmitted via a respective antenna. There are two classes of space-time coding techniques: space-time block coding (STBC) and space-time trellis coding (STTC).

Space-time block coding is a type of space-time coding used in multiple-antenna wireless communication systems. Space-time block coding transmits multiple copies of a data stream across a number of antennas, and exploits the various received versions of the data to improve reliability of the data-transfer. The fact that transmitted data traverses a potentially difficult environment with scattering, reflection and refraction, as being corrupted by thermal noise in the receiver, means that some of the received copies of the data will be better than others.

This redundancy results in a higher chance of being able to use one or more of the received copies of the data to correctly decode the received signal Space-time coding combines all the copies of the received signal in an optimal way to extract as much information from each of them as possible.

Figure 1:
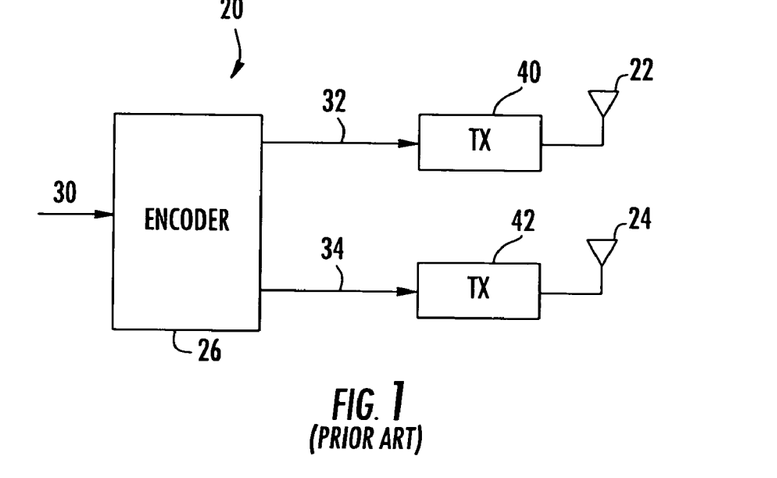
FIG. 1 is a block diagram of a space-time coded communications device in accordance with the prior art.

An example of a conventional space-time coded communications device 20 with two antennas 22, 24 is shown in FIG. 1. For every input symbol 30 received by the encoder 26, two channel symbols 32, 34 are output. Each channel symbol 32, 34 is then modulated and up-converted into a radio frequency (RF) signal by a respective transmitter 40, 42. The up-converted signals are then transmitted by antennas 22, 24. As shown in the figure, two RF transmitter chains 40, 42 are required for the two-antenna system.

Still referring to the encoder 26, for every two incoming symbols S0 and S1 during an interval of the first symbol interval 30, the communications device 20 transmits symbol S0 from antenna 22 and symbol S1 from antenna 24. During a second symbol interval, symbol S0* is transmitted from antenna 22 and symbol −S1* is transmitted from antenna 24, where the superscript * denotes a complex conjugate. The transmitted symbols can be decoded at the receiver using straightforward linear operations. Due to its simplicity, space-time block coding has been adapted by multiple wireless communication standards, such as cdma2000, UMTS W-CDMA, IEEE 802.11n and IEEE 802.16. However, a problem with space-time block coding is that it does not provide coding gain.

As with space-time block coding discussed above, space-time trellis coding is a type of space-time coding also used in multiple-antenna wireless communications systems. Space-time trellis coding transmits multiple, redundant copies of a trellis (or convolutional) code distributed over time and a number of antennas (i.e., space). These multiple, diverse copies of the data are used by the receiver to reconstruct the actual transmitted data. For a space-time code to be used, there must necessarily be multiple transmit antennas, but only a single receive antennas is required. Nonetheless, multiple receive antennas are often used since the performance of the communications system is improved.

In contrast to space-time block coding, space-time trellis coding provides both coding gain and diversity gain and has a better bit-error rate performance. However, since space-time trellis coding is based on trellis codes, it is more complex to encode and decode than space-time block coding. Space-time trellis coding relies on a Viterbi decoder at the receiver, where space-time block coding needs only linear processing.

The output of the encoder in space-time trellis coding is thus determined by a trellis structure. The status of the trellis is fully characterized by its state. A state transition is incurred by every incoming information symbol. Along with the state transition, multiple channel symbols are output. Each channel symbol is then modulated and transmitted by an antenna. By properly designing the trellis structure, both diversity and coding gain can be achieved. Space-time codes for wireless communications systems is disclosed in greater detail in an article titled "Space-Time Codes for High Data Rate Wireless Communication: Performance Criterion and Code Construction," by Tarokh et al., which is incorporated herein by reference in its entirety.

As shown in FIG. 1, each transmitter 40, 42 is directly coupled to a respective antenna 22, 24. The communications device illustrated in the Tarokh et al. article also has a respective antenna directly coupled to a transmitter. For these space-time coding systems using spatial transmit diversity, there is a cost and power consumption penalty for each transmitter. For battery operated communications systems utilizing spatial transmit diversity, extending the operating time of the battery, as well as reducing costs, are important concerns that need to be addressed.

SUMMARY OF THE INVENTION

In view of the foregoing background, an object of the present invention is to reduce power consumption for a multi-antenna communications device utilizing spatial transmit diversity.

This and other objects, advantages and features in accordance with the present invention are provided by a wireless communications device comprising an encoder having an input for receiving input symbols, and generating based upon the input symbols channel symbols and antenna control symbols, and at least one transmitter is coupled to the encoder for receiving the channel symbols. An antenna switch may be coupled to the encoder for receiving the antenna control symbols, and to the at least one RF transmitter chain for receiving the channel symbols to be transmitted. An antenna array may be coupled to the antenna switch and comprises N antenna elements, where $N \geq 2$. The antenna switch may select less than N antenna elements based upon the antenna control symbol for transmitting the channel symbols therefrom.

The at least one transmitter may comprise M transmitters, where M<N. Consequently, the number of transmitters in the communications device is less than the number of antennas. By reducing the number of transmitters yet still providing spatial transmit diversity whose order equals to the number of antennas, power consumption and costs are reduced. For battery operated communications devices, such as cellular telephones for example, this is particularly beneficial.

The antenna switch may operate based upon coding matrices. Each column of the coding matrix may include at least one 0 entry. A 0 entry corresponds to one of the N antenna elements not being used. When there are M transmitters as noted above, each column of the coding matrix may include M or less non-zero entries. Non-zero entries represent the channel symbols being transmitted.

The coding matrices may be based upon a trellis structure. The coding matrices are designed so that difference matrices between any pair of different coding matrices have a rank equal to N, which is equal to the number of antenna elements. The pair of different code words may differ in channel symbols but not antenna control symbols. Alternatively, the pair of different code words may differ in antenna control symbols but not in channel symbols.

A receiver assembly may operate based upon a Viterbi algorithm for decoding the transmitted channel symbols. More particularly, the receiver assembly may comprise an antenna array, at least one demodulator coupled to the antenna array, and at least one channel estimator coupled to the antenna array and to the at least one demodulator for estimating radio frequency (RF) characteristics of the received channel symbols.

The N antenna elements may comprise N active antenna elements so that the antenna array forms a phased array. Alternatively, the N antenna elements may comprise at least one active antenna element, and up to N−1 passive antenna elements so that the antenna array forms a switched beam antenna.

Another aspect of the present invention is directed to a method of operating a wireless communications device as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 2:
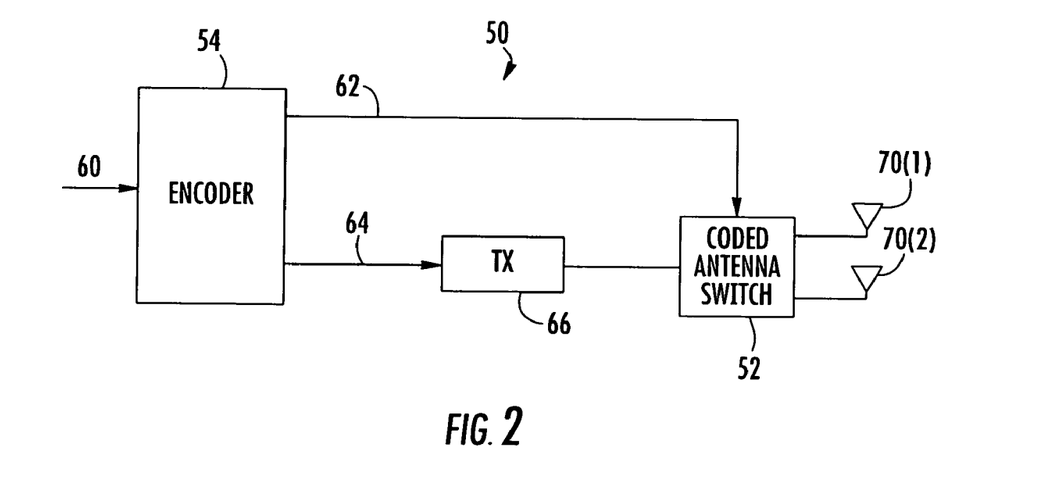
FIG. 2 is a block diagram of a space-time coded communications device with a single transmitter in accordance with the present invention.

Referring initially to FIG. 2, a block diagram of a communications device 50 operating with a coded antenna switch 52 to provide spatial transmit diversity will be discussed. In the illustrated example, for every input symbol 60, the encoder 54 outputs two symbols 62, 64. One of the symbols is a channel symbol 64 and the other symbol is an antenna control symbol 62. The channel symbol 64 is modulated and up-converted into an RF signal via transmitter 66. The RF signal is then passed to the coded antenna switch 52. The antenna control symbol 62 is used to control the antenna switch 52.

For purposes of discussing the present invention, a single transmitter 66 is coupled between the encoder 54 and the antenna switch 52, and a pair of antennas 70(1), 70(2) is coupled to the antenna switch 52. The communications device 50 is not limited to this configuration. The number of antennas is $\geq$N, where is at least 2. The number of transmitters is equal to M, where M<N.

Since there are only 2 antennas 70(1) and 70(1), the antenna control symbol 62 contains one bit. When the antenna control symbol 62 takes a value of 1, the channel symbol 64 is transmitted from antenna 70(1). When the antenna control symbol 62 takes a value of 0, the channel symbol 64 is transmitted from antenna 70(1). By having an output from the encoder 54 control the antenna switch 52, spatial transmit diversity and coding gain is obtained as in the conventional communications device 20 shown in FIG. 1—but with one less transmitter.

For handheld portable devices that are battery operated, such as cellular telephones or portable computers, for example, wireless link reliability is still maintained and/or enhanced without increasing the drain on the battery when the number of transmitters is reduced. Moreover, the cost of such devices is also reduced.

Figure 3:
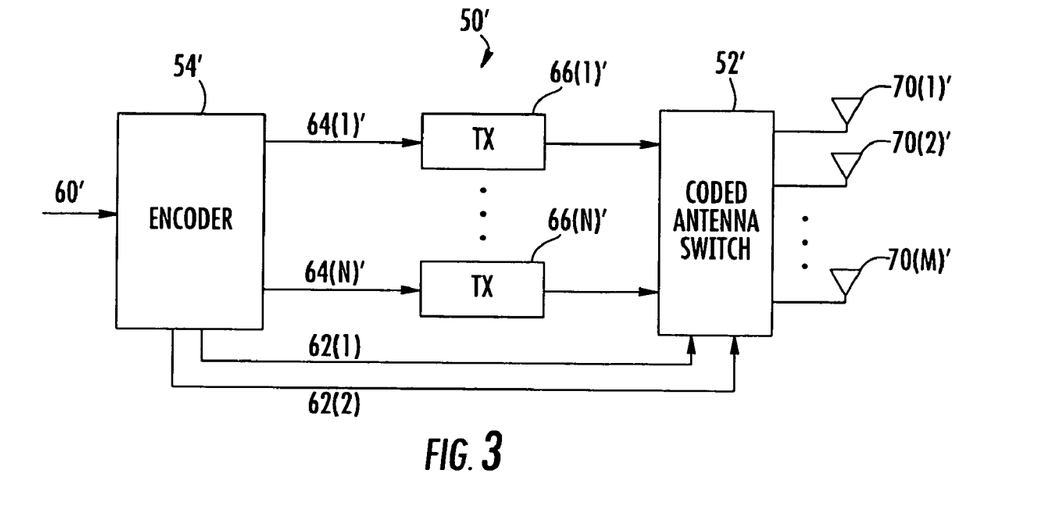
FIG. 3 is a block diagram of a space-time coded communications device with multiple transmitters in accordance with the present invention.

As will now be discussed in greater detail, the antenna switch 52 operates based upon coding matrices such that difference matrices between any pair of different coding matrices have a rank equal to the number of antennas. The coding matrix is generated by the encoder 54 based upon a trellis structure. FIG. 3 depicts a block diagram of another embodiment of a space-time coded communications device 50' in accordance with the present invention. For every input symbol, the encoder 54' outputs N symbols 64(1)'-64(N)'. Each of the channel symbols 64(1)'-64(N)' are modulated and converted to an RF signal by a respective transmitter 66(1)'-66(M)'.

The RF signals are then passed to a coded antenna switch 52', where N out of M available antennas 70(1)'-70(M)' are chosen and coupled to the N transmitters 66(1)'-66(M)'. The N out of M antennas are chosen based upon antenna control symbols 62(1)'-62(2)' generated by the encoder 54'. Using such an arrangement, a higher order of diversity gain can be achieved by the communications device 50', as well as a coding gain. The coded antenna switch 52' is also referred to as an antenna mapping and connecting network.

As readily understood by those skilled in the art, space-time codes are fully described by coding matrices. Equation 1 is an example of a space-time code matrix, whose entry $a_{ML}$ represents a signal that is transmitted from the m_th TX antenna during an l_th time interval.

$$A = \begin{pmatrix} a_{11} & a_{12} & \cdots & a_{1L} \\ a_{21} & a_{22} & \cdots & a_{2L} \\ \vdots & \vdots & \ddots & \vdots \\ a_{M1} & a_{M2} & \cdots & a_{ML} \end{pmatrix} \quad \text{Equation 1}$$

Matrix A1 and A2 may be any two distinct space-time code matrices, and the difference matrix D=A1−A2. Accordingly, the criteria for designing good space-time codes is as follows: 1) rank (i.e., diversity) criteria: rank of matrix D equals the number of transmit antennas M. This is to ensure that the diversity order is equal to the number of transmit antennas M; and 2) determinant (i.e., coding gain) criteria: maximize the determinant of matrix $DD^H$.

In conventional space-time codes, there is no zero element existing in any code matrix. Each element takes a value from a certain alphabet determined by a modulation scheme, such as MPSK, QAM, etc.

In accordance with the present invention, an element zero is added to the original alphabet to form a super alphabet. The space-time code matrix in accordance with the present invention is designed in such a way that i) each entry of the matrix can take a value from the original alphabet or zero, and ii) the maximum number of non-zero elements in each column does not exceed the number of transmitters N. The code words are thus sparse matrices with zeros (0) embedded therein, as provided in equation 2.

$$B = \begin{pmatrix} b_{11} & 0 & \cdots & 0 \\ 0 & b_{22} & \cdots & b_{2L} \\ \vdots & \vdots & \ddots & \vdots \\ b_{M1} & b_{M2} & \cdots & 0 \end{pmatrix} \quad \text{Equation 2}$$

Since there is no need to transmit an element zero (0) over the air, the number of transmitters N required to transmit space-time codes is less than the number of antennas M, which ultimately determines diversity order and coding gain. The space-time encoder 54' determines not only the symbols 64(1)'-64(N)' to be transmitted, but also determines which antennas 70(1)'-70(M)' are to be used to transmit the symbols.

The interconnection between the transmitters 66(1)'-66(N)' and the antennas 70(1)'-70(M)' is determined by the space-time encoder 54'. For example, to transmit in a three antenna system 70(1)'-70(3'), where M=3, and N equals 2 so that there are 2 transmitters 66(1)'-66(2)', the following code word provided in equation 3 may be used $$D = \begin{pmatrix} d_{11} & 0 & d_{13} \\ 0 & d_{22} & 0 \\ d_{31} & d_{32} & d_{33} \end{pmatrix} \quad \text{Equation 3}$$

Based upon this code word, transmitter 66(1)' uses antenna 70(1)' to transmit symbol d11, and transmitter 66(2)' uses antenna 70(3) to transmit symbol d31 in a first time interval. Likewise, during a second time interval, transmitter 66(1)' uses antenna 70(2)' to transmit symbol d22, and transmitter 66(2)' uses antenna 70(3)' to transmit symbol d32. In a third interval, transmitter 66(1)' uses antenna 70(1)' to transmit symbol d13, and transmitter 66(2)' uses antenna 70(3) to transmit symbol d33. In this example, only two transmitters 66(1)' and 66(2)' are needed to achieve a diversity order of three, and a potentially higher coding gain than a conventional two transmitter/two antenna system. In other words, the maximum number of non-zero entries of a code word at any time interval is equal to or less than the number of transmitters N.

In terms of performance comparisons, the concept of sparse code words can be applied to conventional space-time codes whose code words are restricted to the following format:

$$B' = \begin{pmatrix} b_{11} & b_{12} & \cdots & b_{1L} \\ b_{21} & b_{22} & \cdots & b_{2L} \\ \vdots & \vdots & \ddots & \vdots \\ b_{N1} & b_{N2} & \cdots & b_{NL} \\ 0 & 0 & \cdots & 0 \\ 0 & 0 & \cdots & 0 \end{pmatrix} \quad \text{Equation 4}$$

These code words can also be applied to a straightforward switched diversity communications device whose code words are restricted to the following format:

$$B'' = \begin{pmatrix} b_{11} & 0 & \cdots & 0 & b_{1,M+1} & 0 & \vdots \\ 0 & b_{22} & \cdots & 0 & 0 & b_{2,M+2} & \vdots \\ \vdots & \vdots & \ddots & \vdots & \vdots & \vdots & \vdots \\ 0 & 0 & \cdots & b_{MM} & 0 & 0 & \vdots \end{pmatrix} \quad \text{Equation 5}$$

Conventional space-time coding and switched diversity can be viewed as special cases of the present invention. The difference is that the present invention does not impose unnecessary constrains in a placing zero (0) entry in the coding matrices. Therefore, the present invention can perform better than conventional space-time coding and antenna switched diversity by carefully placing zero (0) entries in the coding matrices.

Figure 4:
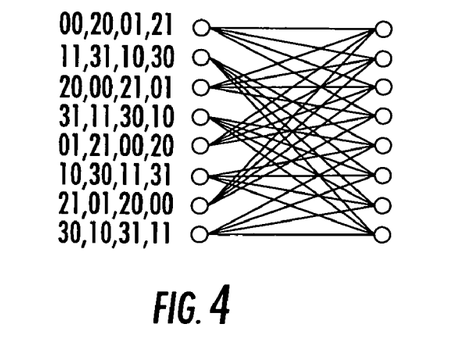
FIG. 4 is an example of a space-time trellis code in accordance with the communications device shown in FIG. 2.

FIG. 4 is an example of a space-time trellis code in accordance with the communications device 50 shown in FIG. 2. For each state transition, the encoder 54 outputs two symbols. As discussed above, the first symbol 64 is a channel symbol that is modulated, and converted to RF via transmitter 66. The second symbol 62 is an antenna control symbol, which decides which antenna 70(1) or 70(2) is to be used to transmit the channel symbol 64.

Figure 5:
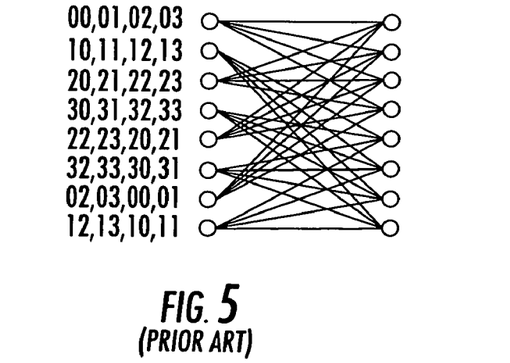
FIG. 5 is an example of a space-time trellis code in accordance with the communications device shown in FIG. 1.

FIG. 5 is an example of a conventional space-time trellis code developed by Tarokh et. al. A state transition is triggered by each input symbol, which is defined by the trellis. Along with the state transition, the space-time encoder 26 outputs two channel symbols 32, 34 as shown in FIG. 1. The first symbol 32 is modulated, converted to RF and transmitted from antenna 22. The second symbol 34 is modulated, converted to RF and transmitted from antenna 24.

Figure 6:
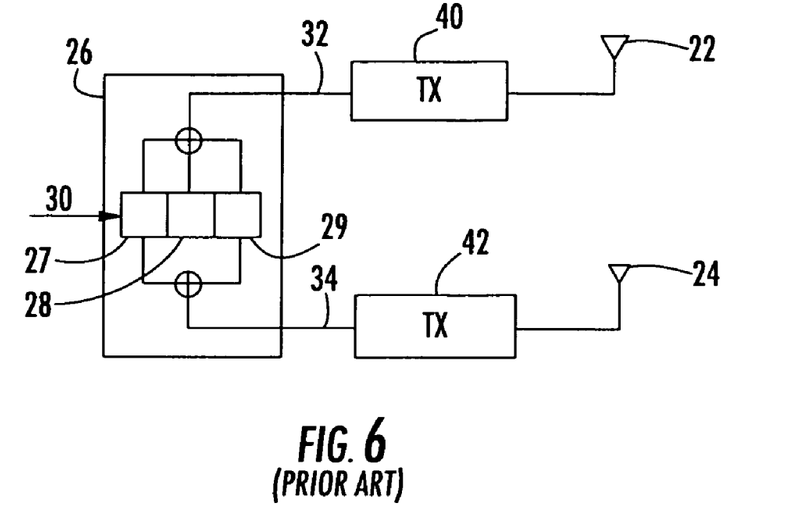
FIG. 6 is a block diagram of the communications device shown in FIG. 1 with the encoder illustrated in greater detail.
Figure 7:
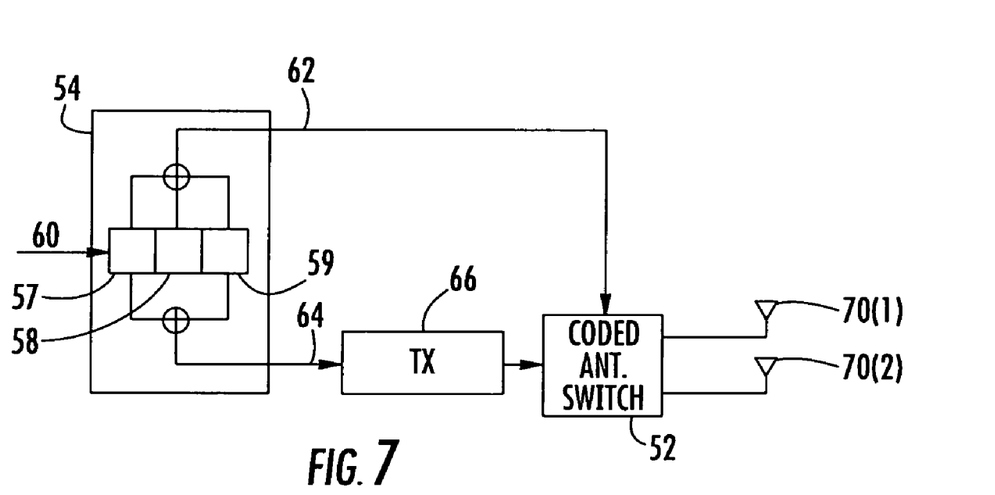
FIG. 7 is a block diagram of the communications device shown in FIG. 2 with the encoder illustrated in greater detail.

For comparison purposes, reference is directed to FIGS. 6 and 7. In FIG. 6, the encoder 26 (FIG. 1) uses convolutional coding as space-time coding. Bits of an input symbol are input to registers 27, 28 and 29. An exclusive OR of the bits in these registers is sent to each of the respective transmitters 40, 42. Using the same coding structure as shown in FIG. 7, the encoder 54 (FIG. 2) also receives bits of an input symbol which are input to registers 57, 58 and 59. An exclusive OR of the bits in these registers is sent to the coded antenna switch 52, and to the transmitter 66 for transmission from one of the antennas 70(1) or 70(2).

Figure 8:
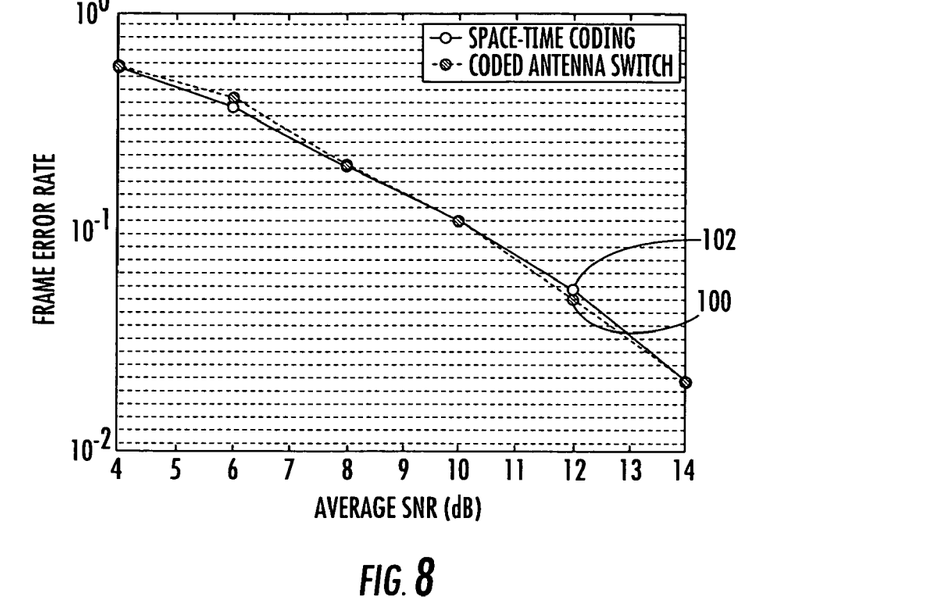
FIG. 8 is a graph comparing performance in Rayleigh fading of a space-time coding communications device versus a coded antenna switch communications device in accordance with the present invention.

FIG. 8 compares performance of the communications devices 20, 50 shown in FIG. 6 and FIG. 7 in a Rayleigh fading environment. The graph is average signal to noise ratio (SNR) versus frame error rate. Line 100 represents communications device 50 with coded antenna switching, and line 102 represents communications device 20 with conventional space-time coding. Communications device 50 with coded antenna switching performs similarly to communications device 20 with conventional space-time coding. However, the present invention only requires one RF chains as opposed to two RF chains in conventional space-time coding.

Figure 9:
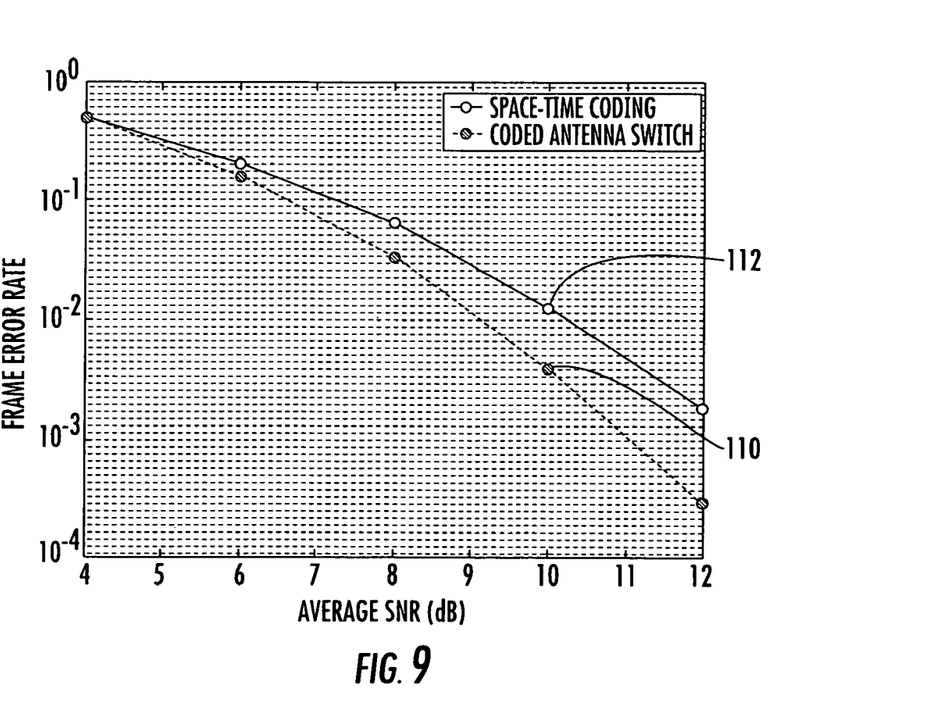
FIG. 9 is a graph comparing performance in a Rician channel of a space-time coding communications device versus a coded antenna switch communications device in accordance with the present invention.

Similarly, FIG. 9 compares performance of the communications devices 20, 50 shown in FIG. 6 and FIG. 7 in a Rician fading environment with a line-of-sight component 10 dB stronger than a non-line-of-sight component. The graph is also average signal to noise ratio (SNR) versus frame error rate. Line 110 represents communications device 50 with coded antenna switching, and line 112 represents communications device 20 with conventional space-time coding Communications device 50 with coded antenna switching out performs communications device 20 with conventional space-time coding. One intuitive way to understand this is that in the presence of line-of-sight, signals transmitted from different antennas may cancel each other and result in low performance. However, this does not occur in the transmitter 66 in FIG. 2 since only one signal is transmitted at any given time.

To properly decode the channel symbols 64 transmitted by the communications device 50, a Viterbi decoder is required. A block diagram of such a receiver assembly 120 for receiving the channel symbols is provided in FIG. 10. A receive antenna array 122 receives the signals that include the antenna modulated channel symbols. The receive antenna array 122 may comprise one or more antenna elements for generating one or more receive antenna patterns.

Figure 10:
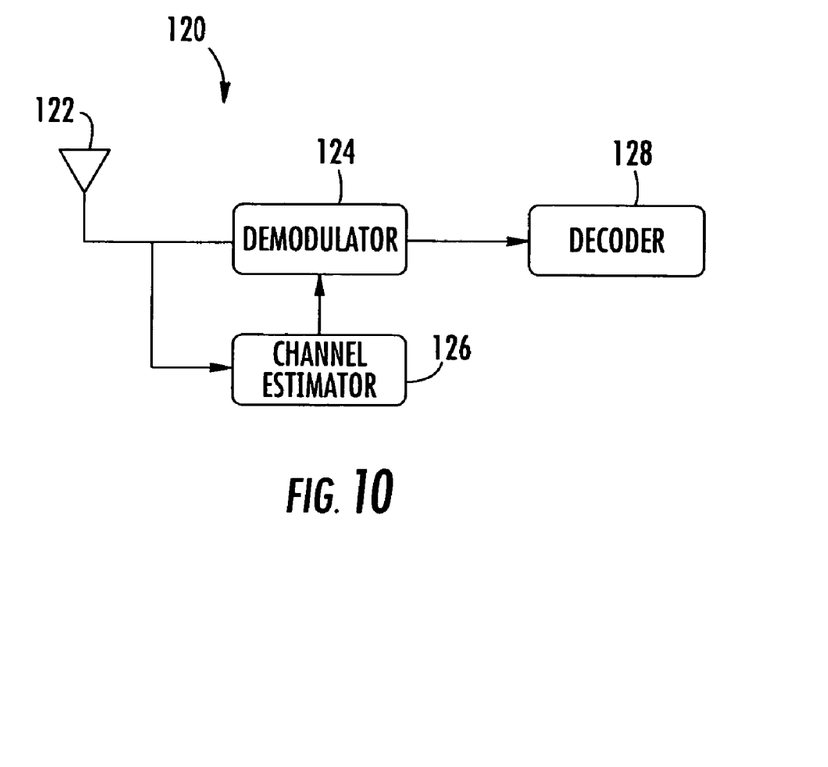
FIG. 10 is a block diagram of a receiver assembly in accordance with the present invention

The received signal is applied as input to a demodulator 124 and to a channel estimator 126. The channel estimator 126 extracts known reference symbols from the received signal. These reference symbols, which may be pilot symbols, for example, are used to estimate the radio frequency (RF) characteristics of the received signal associated with each transmit and receive antenna pair. The channel estimator 96 estimates the RF characteristics The RF characteristics of the received signal may include attributes such as amplitude, phase, delay spread and frequency response. The estimated RF characteristics are then sent to the demodulator 124. The output of the demodulator 124 is applied to a Viterbi decoder 128.

Without a loss of generality, the transmitter 66 shown in FIG. 2 is used as an example to demonstrate how the decoder works in detail. The convolutional encoder used here is a ½ rate convolutional encoder. Corresponding to each information bit, there are two coded output bits.

Figure 11:
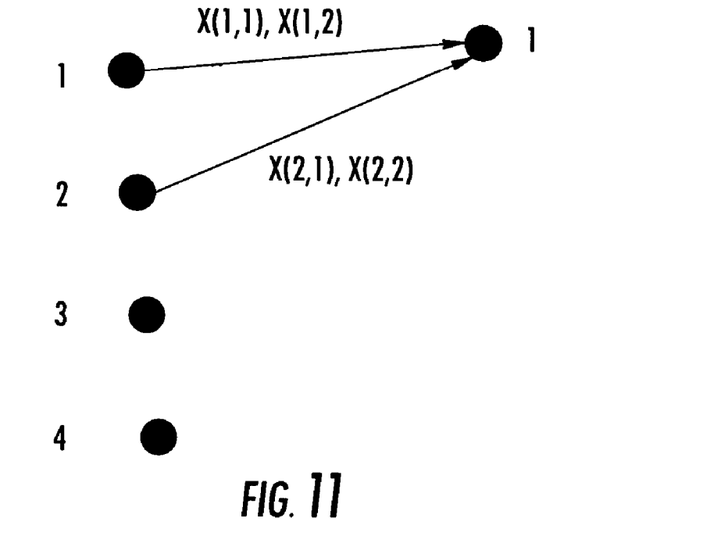
FIG. 11 is a partial trellis structure in accordance with the present invention.

A partial trellis structure is shown in FIG. 11. According to this trellis structure, there are two possible transitions ended at state 1, one starting from state 1, and another starting from state 2. The Viterbi algorithm in the decoder 128 operates as follows. For each state, there is a metric associated with it. For each transition, an incremental metric is calculated. In the example of FIG. 11, let the metric associated with state 1 and 2 at time instant t be M1(t) and M2(t), respectively, and let an incremental metric associated with transition from state 1 to state 1, and from state 2 to state 1 be m1(t) and m2(t), respectively.

Then there are two competing metrics (M1(t)+m1(t), and M2(t)+m2(t)) entering state 1 after transition. Only the favorable metric survives and the others are eliminated. The process continues until the sequence ends. This is the general principle of the Viterbi algorithm, which has a low complexity implementation of a maximum likelihood decoder. The Viterbi algorithm applies to conventional convolutional codes, or convolutional codes used as space-time codes (natural space-time codes), or the coded antenna switching in accordance with the present invention. The only difference is how to calculate incremental metrics.

To calculate the incremental metric associated with each transition, channel state information (CSI) would have to be estimated first. There are various way to obtain CSI estimation, as readily appreciated by those skilled in the art. In the following description, CSI is assumed to be known at the receiver, and we denote CSI between the first transmit antenna and receive antenna be $c_0(t)$, and CSI between the second transmit antenna and receive antenna be $c_1(t)$. Considering the example in FIG. 11, bits $x_{11}(2t)$ and $x_{11}(2t+1)$ are encoder output at time instant t if the transition is from state 1 to state 2, and bits $x_{21}(2t)$ and $x_{21}(2t+1)$ are encoder output if transition is from state 2 to state 1.

In the present invention, only the first bit is transmitted over the air, and the second bit is used as an antenna index. Accordingly, the incremental metric of the current invention can be calculated according to the following equation if assuming the received signal is y(t):

$$m1(t)=|y(t)-a_{x_{11}(2t+1)}(t)x_{11}(2t)|^2 \qquad \text{Equation 6}$$

$$m2(t)=|y(t)-a_{x_{21}(2t+1)}(t)x_{21}(2t)|^2 \qquad \text{Equation 7}$$

For comparison purposes, calculations of incremental metrics for space-time coding and coded antenna switching are discussed below. In space-time coding case, both bits of the convolutional encoder are transmitted over the air. The first bit is transmitted via the first antenna, and the second bit is transmitted from the second antenna. The incremental metric is calculated as:

$$m1(t) = \left| y(t) - \frac{1}{\sqrt{2}}a_0(t)x_{11}(2t) - \frac{1}{\sqrt{2}}a_1(t)x_{11}(2t+1) \right|^2 \qquad \text{Equation 8}$$

The square root of 2 is a normalizing factor to ensure total transmit power. For a straightforward antenna switching scheme, to achieve the same data rate, one of the two encoder output bits is filtered out while the other bit is alternately transmitted from the two antennas. Assuming the first bit is transmitted, the incremental metric is calculated as following:

$$m1(t)=|y(t)-a_k x_{11}(2t)|^2 \qquad \text{Equation 9}$$

where antenna index k takes value of 0 and 1 in an alternating fashion.

One way to understand the advantage of current invention over simple switch diversity is that in simple switch diversity, half of the coded bits are filtered or removed and are not transmitted, which results in a low coding gain. However, in the current invention, although only half of the coded bits are explicitly transmitted over the air, the other half of the bits are implicitly transmitted (i.e., embedded in the usage of the transmit antenna). By utilizing the Viterbi algorithm at the receiver, extra (spatial) coding gain can be achieved by incorporating both explicitly and implicitly transmitted information.

For systems with the same number of transmitters as there are antennas, both conventional space-time codes and switched diversity schemes are not optimized with non-zero entries in the code words. In contrast, antenna coded switching with zero entries is at least as good as conventional space-time codes or switched diversity schemes in terms of both diversity gain and coding gain. By properly designing the code words in the coded antenna switching scheme, there will be a significant performance increase over conventional space-time codes/switched diversity.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed is:

1. A wireless communications device comprising:
an encoder having an input for receiving an input symbol and generating two coded output symbols in response to the input symbol, with one coded output symbol corresponding to a channel symbol to be transmitted and with the other coded symbol corresponding to an antenna control symbol that is not to be transmitted;
at least one transmitter coupled to said encoder for receiving the channel symbol to be transmitted;
an antenna switch coupled to said encoder for receiving the antenna control symbol that is not to be transmitted, and to said at least one transmitter for receiving the channel symbol to be transmitted; and
an antenna array coupled to said antenna switch and comprising N antenna elements, with N≧2;
said antenna switch selecting less than N antenna elements based upon the antenna control symbol, wherein a selected antenna element for transmitting the channel symbol is determined by the antenna control symbol.

2. A wireless communications device according to claim 1 wherein said at least one transmitter comprises M transmitters, where M<N.

3. A wireless communications device according to claim 1 wherein said antenna switch operates based upon a coding matrix.

4. A wireless communications device according to claim 3 wherein said encoder generates the coding matrix based upon a trellis structure.

5. A wireless communications device according to claim 3 wherein each column of the coding matrix includes at least one 0 entry.

6. A wireless communications device according to claim 3 wherein said at least one transmitter comprises M transmitters, where M<N; and wherein each column of the coding matrix includes M or less non-zero entries.

7. A wireless communications device according to claim 3 wherein the coding matrix is based upon a difference matrix between any pair of different coding matrices having a rank equal to N.

8. A wireless communications device according to claim 7 wherein the pair of different coding matrices differ in channel symbols but not antenna control symbols.

9. A wireless communications device according to claim 7 wherein the pair of different coding matrices differ in antenna control symbols but not in channel symbols.

10. A wireless communications device according to claim 1 wherein said N antenna elements comprise N active antenna elements so that said antenna array forms a phased array.

11. A wireless communications device according to claim 1 wherein said N antenna elements comprise at least one active antenna element, and up to N−1 passive antenna elements so that said antenna array forms a switched beam antenna.

12. A wireless communications system comprising:
at least one wireless communications device comprising
an encoder having an input for receiving an input symbol and generating coded output symbols in response to the input symbol, with a subset of the coded symbols corresponding to channel symbols to be transmitted and with a different subset of the coded output symbols corresponding to antenna control symbols that are not to be transmitted;
M transmitters coupled to said encoder for receiving the channel symbols, with M≧1,
an antenna switch coupled to said encoder for receiving the antenna control symbols, and to said at least one transmitter for receiving the channel symbols to be transmitted, and
an antenna array coupled to said antenna switch and comprising N antenna elements, with N≧2,
said antenna switch selecting M antenna elements based upon the antenna control symbols, wherein a selected antenna element for transmitting the channel symbols is determined by the antenna control symbols, with M<N.

13. A wireless communications system according to claim 12 further comprising a receiver assembly operating based upon a Viterbi algorithm for decoding the transmitted channel symbols.

14. A wireless communications system according to claim 13 wherein said receiver assembly comprises:
an antenna array;
at least one demodulator coupled to said antenna array; and
at least one channel estimator coupled to said antenna array and to said at least one demodulator for estimating characteristics of the received channel symbols.

15. A wireless communications system according to claim 12 wherein said antenna switch operates based upon a coding matrix.

16. A wireless communications system according to claim 15 wherein said encoder generates the coding matrix based upon a trellis structure.

17. A wireless communications system according to claim 15 wherein each column of the coding matrix includes at least one 0 entry.

18. A wireless communications system according to claim 15 wherein each column of the coding matrix includes M or less non-zero entries.

19. A wireless communications system according to claim 15 wherein the coding matrix is based upon a difference matrix between any pair of different coding matrices having a rank equal to N.

20. A wireless communications system according to claim 19 wherein the pair of different coding matrices differ in channel symbols but not antenna control symbols.

21. A wireless communications system according to claim 19 wherein the pair of different coding matrices differ in antenna control symbols but not in channel symbols.

22. A wireless communications system according to claim 12 wherein said N antenna elements comprise N active antenna elements so that said antenna array forms a phased array.

23. A wireless communications system according to claim 12 wherein said N antenna elements comprise at least one active antenna element, and up to N−1 passive antenna elements so that said antenna array forms a switched beam antenna.

24. A method for operating a wireless communication device comprising an encoder, at least one transmitter coupled to the encoder, an antenna switch coupled to the encoder and to the at least one RF transmitter chain, and an antenna array coupled to the antenna switch, the antenna array comprising N antenna elements, with N≧2, the method comprising:

providing an input symbol to the encoder, and generating two coded output symbols in response to the input symbol, with one coded output symbol corresponding to a channel symbol to be transmitted and with the other coded symbol corresponding to an antenna control symbol that is not to be transmitted;

providing the channel symbol to the antenna switch via the at least one transmitter to be transmitted;

providing the antenna control symbol to the antenna switch that is not to be transmitted; and operating the antenna switch for selecting less than N antenna elements based upon the antenna control symbol, wherein a selected antenna element for transmitting the channel symbol therefrom is determined by the antenna control symbol.

25. A method according to claim 24 wherein the at least one transmitter comprises M transmitters, where M<N.

26. A method according to claim 24 wherein the antenna switch operates based upon a coding matrix.

27. A method according to claim 26 wherein the encoder generates the coding matrix based upon a trellis structure.

28. A method according to claim 26 wherein each column of the coding matrix includes at least one 0 entry.

29. A method according to claim 26 wherein the at least one transmitter comprises M transmitters, where M<N; and wherein each column of the coding matrix includes M or less non-zero entries.

30. A method according to claim 26 wherein the coding matrix is based upon a difference matrix between any pair of different coding matrices having a rank equal to N.

31. A method according to claim 30 wherein the pair of different coding matrices differ in channel symbols but not antenna control symbols.

32. A method according to claim 30 wherein the pair of different coding matrices differ in antenna control symbols but not in channel symbols.

33. A method according to claim 24 wherein the N antenna elements comprise N active antenna elements so that the antenna array forms a phased array.

34. A method according to claim 24 wherein the N antenna elements comprise at least one active antenna element, and up to N−1 passive antenna elements so that the antenna array forms a switched beam antenna.

* * * * *